UNITED STATES PATENT OFFICE.

SPENCER B. NEWBERRY, OF BAYBRIDGE, OHIO, ASSIGNOR OF ONE-HALF TO GEORGE B. FISHBURNE, OF CHARLESTON, SOUTH CAROLINA.

FERTILIZER AND PROCESS OF MAKING THE SAME.

972,567.  Specification of Letters Patent.  Patented Oct. 11, 1910.

No Drawing.  Application filed March 3, 1909. Serial No. 481,203.

*To all whom it may concern:*

Be it known that I, SPENCER B. NEWBERRY, a citizen of the United States, and resident of Baybridge, in the county of Erie and State of Ohio, have invented certain new and useful Improvements in Fertilizers and Processes of Making the Same, of which the following is a specification.

This invention relates to a novel fertilizing composition and the process of making the same from phosphate rock, apatite, bones, etc., and it will be clearly understood from the following description.

It is well known that the phosphate of lime contained in native phosphate rock, apatite, bones, etc., is present in these materials in an insoluble form, and is not available for absorption by plants until converted into soluble form by chemical treatment. The process almost universally followed is that of treatment with sulfuric acid.

I have found that the insoluble phosphate of lime contained in natural phosphates,—under which term I include phosphate rock, apatite and bone phosphate,—may be rendered completely or almost completely soluble by calcination with a comparatively small proportion of phosphoric acid or of a water soluble phosphate such as phosphate of soda or phosphate of potash. Owing to the tendency of phosphoric acid to volatilize at high temperatures I prefer to use phosphate of soda or of potash. Either monophosphate, diphosphate, or tri-phosphate may be used, and these are practically equally efficient when used in equal quantity. These phosphates of soda or potash may be made advantageously from native phosphates of lime or phosphates of alumina and iron, by processes which form no part of the invention herein described. I find that to convert all the phosphate of lime contained in the natural phosphate into citrate soluble form, an amount of anhydrous phosphate of soda or phosphate of potash, equal to from 25 to 40 per cent. by weight of the total phosphate of lime contained in the natural phosphate is required. The effect of this addition is not only to render the phosphate of lime soluble, but also to materially increase the percentage of total phosphoric acid over that contained in the natural phosphate, thus giving the product a considerably greater commercial and fertilizing value. For example, 100 parts by weight of a phosphate rock containing 60 per cent. phosphate of lime or 27.5 per cent. phosphoric acid, ($P_2O_5$), will require 15 to 25 parts of anhydrous phosphate of soda or phosphate of potash, and if 20 parts anhydrous sodium phosphate, ($HNa_2PO_4$,) are used, the product of calcination will contain 37.5 per cent. soluble phosphoric acid, ($P_2O_5$). The amount of additional phosphoric acid required to render soluble all the phosphate of lime present is approximately that theoretically necessary to form di-calcium phosphate, according to the reaction

In the case of phosphate of soda or phosphate of potash, the hydrogen of the di-calcium phosphate is doubtless more or less completely replaced by sodium or potassium, forming as typical compounds $CaNaPO_4$ and $CaKPO_4$, respectively. These compounds are however not known in a pure or free state, and their formation is therefore only suggested as a hypothesis. Assuming such formation, the reaction in the case of ordinary sodium phosphate would be

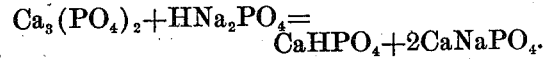

This equation would require 45.8 parts of anhydrous sodium phosphate to 100 parts phosphate of lime, and I have found that practically complete solubility results from the use of a considerably less quantity, viz., from 25 to 40 per cent., as previously stated. I am aware that a product of similar high percentage of soluble phosphoric acid is made, under the name of "double superphosphate," by dissolving natural phosphates in sulfuric acid and treating raw bone phosphates, guano, etc., with the phosphoric acid solution so obtained. It is well-known, however, that phosphate rock or apatite is but little acted on by phosphoric acid in solution, while the method of calcination with phosphoric acid or alkaline phosphates herein described is effective when applied to such insoluble natural phosphates, and also the low-grade phosphate rock which cannot profitably be used in making superphosphate or double superphosphate by the sulfuric acid process.

An illustration of the practical working of the process is as follows: I take ordinary phosphate rock, or apatite, or bone phosphate, and grind to fine powder by suitable machinery. I add the required amount of phosphate of soda or phosphate of potash, or a mixture of both, either in the form of dry powder, or by grinding with the natural phosphate, or by adding solution of phosphate of soda or phosphate of potash to the ground natural phosphate. The materials are well mixed, and calcined at a bright orange or nearly white heat, in kilns similar to those used in cement burning, and at a temperature approximately equal to that employed in that industry. The calcined material, which is discharged from the kiln in rather soft balls or grains, is ground to fine powder, and is then in condition to be used as fertilizer or as an ingredient of commercial fertilizers.

By the above described process I obtain a product rich in phosphoric acid, in which all but an insignificant part of the phosphoric acid is soluble in ammonium citrate solution and therefore in condition to be readily absorbed from the soil in the process of plant growth. This product is superior to ordinary commercial superphosphate obtained by the sulfuric acid process on account of its higher content of phosphoric acid, and the fact that the phosphoric acid contained in it, while gradually soluble in the acids of the soil and absorbable by plants, is not soluble in water, and therefore not readily leached out and carried away by the percolation of water through the soil.

Having thus described my invention, what I claim and desire to protect by Letters Patent is as follows:

1. The process of conversion of insoluble phosphate of lime into citrate soluble form by calcination with alkaline phosphate, substantially as described.

2. The process of making fertilizer, which consists in calcining natural phosphates with alkaline phosphate, substantially as described.

3. The herein described process of making citrate soluble phosphate which consists in calcining an insoluble phosphate of lime with a water soluble phosphate.

4. The herein described process of making citrate soluble phosphate which consists in calcining natural phosphate with a water soluble phosphate.

5. The herein described process of making citrate soluble phosphate which consists in calcining an insoluble phosphate with a water-soluble salt of phosphoric acid.

6. A fertilizing material consisting essentially of phosphate of lime rendered citrate soluble by calcination with alkaline phosphate, substantially as described.

7. A fertilizing material consisting essentially of calcium phosphate enriched in phosphoric acid by calcination with alkaline phosphate, substantially as described.

8. A fertilizing material, containing as its essential constituent di-calcium phosphate, $HCaPO_4$, in which the hydrogen is more or less completely replaced by sodium or potassium, substantially as described.

9. A fertilizing material consisting of a calcined mixture of phosphate of lime and alkaline phosphate.

In testimony whereof I affix my signature in presence of two witnesses.

SPENCER B. NEWBERRY.

Witnesses:
P. B. BEERY,
ALLEN KUBACH.